United States Patent
Yamada et al.

[11] Patent Number: 6,129,374
[45] Date of Patent: Oct. 10, 2000

[54] AIR BAG APPARATUS

[75] Inventors: Hisao Yamada; Keizo Suzuki, both of Aichi-ken, Japan

[73] Assignee: Kabushiki Kaisha Tokai-Rika-Denki-Seisakusho, Aichi-ken, Japan

[21] Appl. No.: 09/028,951

[22] Filed: Feb. 24, 1998

[30] Foreign Application Priority Data

Feb. 26, 1997 [JP] Japan ..................................... 9-042739

[51] Int. Cl.$^7$ .................................................. B60R 21/16
[52] U.S. Cl. ........................................ 280/728.2; 280/731
[58] Field of Search ............................. 280/728.2, 728.1, 280/731

[56] References Cited

U.S. PATENT DOCUMENTS

| | | | |
|---|---|---|---|
| 3,680,884 | 8/1972 | Stephenson | 280/731 |
| 3,801,123 | 4/1974 | Jira | 280/731 |
| 4,275,901 | 6/1981 | Okada | 280/741 |
| 5,398,963 | 3/1995 | Fohl | 280/731 |
| 5,609,356 | 3/1997 | Mossi . | |

FOREIGN PATENT DOCUMENTS 9-99796   4/1997   Japan .

*Primary Examiner*—Paul N. Dickson
*Attorney, Agent, or Firm*—Nixon Peabody LLP; Thomas W. Cole

[57] ABSTRACT

An bag apparatus wherein an inflator portion is disposed at a steering column side, a bag portion is disposed at a steering wheel side and in a state in which the inflator portion and the bag portion are relatively rotatable by connecting means, gas which has been generated at the inflator portion is introduced to the bag portion side, and superior effects are achieved in that a space for providing the air bag apparatus at the steering wheel is reduced so as to improve the designing abilities, the mass of the air bag apparatus is decreased so as to improve the vibration characteristics, and a roll connector for transmitting a control signal is not required.

8 Claims, 11 Drawing Sheets

AIR BAG APPARATUS

BACKGROUND OF THE INVENTION

1. Field of the Invention

The present invention relates to an air bag apparatus which is attached to a steering wheel.

2. Description of the Related Art

Recently, a vehicle operator's seat is equipped with, in general, an air bag apparatus serving as a passive safety auxiliary device (SRS: supplemental restraint system). FIG. 11 illustrates the structure of such vehicle operator's seat SRS air bag. The entire air bag apparatus is integrally assembled to a steering wheel 14 which is secured to the distal end portion of a steering main shaft 12 in a steering column 10.

As a result, in the steering wheel 14, a boss portion 18 of the steering wheel 14 is connected to a serration portion 16 at the distal end of the steering main shaft 12. Further, the boss portion 18 is connected to a conical inclined surface of the steering main shaft 12 so that the boss portion 18 is not inserted in the axial direction thereof. The boss portion 18 is secured by a bolt 20 so that the boss portion 18 is not removed from the end portion of the steering main shaft 12. An air bag apparatus main body 26 is provided within a concave space surrounded by the boss portion 18, a spoke portion 22, and a wheel portion 24 of the steering wheel 14. The air bag apparatus main body 26 is covered by a steering wheel pad 28 and a lower cover 30.

In the air bag apparatus main body 26, as gas is rapidly injected from an inflator 34 into a bag body 32 so as to inflate the bag body 32, the steering wheel pad 28 is broken away and the bag body 32 is unfolded in a predetermined state. When large acceleration is applied to a vehicle, an ignition device of the inflator 34 is energized due to the designation of a central control unit which has detected the acceleration, such that gas generating agent is combusted, a large amount of gas is generated, and the bag body 32 is unfolded. In the air bag apparatus main body 26 which performs electrical ignition and control in this way, it is necessary to connect electrically the air bag apparatus main body 26 and the central control unit disposed at the vehicle body side. As a result, an unillustrated roll connector is disposed at a rotating portion between a steering column 10, which is fixed to the vehicle body, and the steering wheel 14, which is rotated with respect to the steering column 10. The central control unit and the inflator 34 are electrically connected via the roll connector so that the inflator 34 is energized highly reliably.

When the air bag apparatus main body 26 is attached to the steering wheel 14 in this way, it is necessary to have a large space for attaching the large roll connector at the rotating portion between the steering column 10 and the steering wheel 14. Therefore, the portion at which the roll connector is disposed is increased, and since the expensive roll connector is used, the product becomes expensive.

Moreover, there is need to increase the concave space surrounded by the boss portion 18, the spoke portion 22, and the wheel portion 24 of the steering wheel 14 so as to accommodate the bag body 32 and the inflator 34 simultaneously. Accordingly, the design of entire steering wheel 14 is restricted. Further, because the bag body 32 and the heavily-weighted inflator 34 are integrally attached to the steering wheel 14, the mass of the rotating portion of the steering wheel 14 increases. Thus, it is difficult to design the steering wheel 14 for improving the vibration characteristics thereof at the time of running of the vehicle.

SUMMARY OF THE INVENTION

With the aforementioned in view, an object of the present invention is to reduce the number of parts of an air bag apparatus disposed at a steering wheel in a case in which the air bag apparatus is provided at the steering wheel.

An air bag apparatus relating to a first aspect of the present invention, comprising: an inflator portion for supplying pressured gas which is attached to a vehicle body side; a bag portion which is attached to a steering wheel side; and connecting means which introduces gas from the inflator portion to the bag portion in a state in which the inflator portion and the bag portion are relatively rotatable.

Due to the aforementioned structure, when the steering wheel is rotated for steerage, the bag portion and a part of the connecting portion which introduces gas from the inflator portion to the bag portion are rotated integrally along with the steering wheel. The inflator portion is fixed to the vehicle body side.

An air bag apparatus relating to a second aspect of the present invention, comprising: an inflator portion which is fixedly disposed at a vehicle body around a steering shaft of a steering column; a bag portion which is attached to a steering wheel and which rotates along with the steering wheel; and a connecting portion which is provided with a rotational connecting member and a gas passage portion, the rotational connecting member being rotatably attached to at least one of the inflator portion and the bag portion so as to keep air tightness, the gas passage portion being connected to an opening of the rotational connecting member such that the gas can be flowed between the inflator portion and the bag portion in a relatively rotatable state, and which introduces gas generated at the inflator portion to the bag portion so as to inflate and unfold a bag.

Due to the aforementioned structure, even if the steering wheel is rotated, the gas which has been generated at the inflator portion is introduced to the bag portion through the opening of the connecting member, which rotates so as to keep the air tightness, and the gas passage portion. The bag portion can be inflated and unfolded by the gas.

In the present invention, if the connecting portion is formed so as to introduce the gas from the inflator portion to the bag portion through an interval between spokes of the steering wheel, the inflator portion and the bag portion can be easily connected.

Further, in the present invention, the inflator portion may have an annular opening portion which opens in the annular shape around an axis of the steering shaft, and the rotational connecting member is rotatably attached to the annular opening portion. The connecting portion can be easily rotated along with the steering wheel.

Moreover, in the present invention, the rotational connecting member may be attached to the inflator portion, the gas passage portion may include a first pipe-shaped body and a second pipe-shaped body, the first pipe-shaped body is connected to an opening of the rotational connecting member and provided in the axial direction of the steering shaft, and the second pipe-shaped body is provided at the bag portion in the axial direction of the steering shaft and is provided so as to be able to fit with the first pipe-shaped body. As the steering wheel is attached to the steering shaft in a state in which the bag portion is provided at the steering wheel, the inflator portion and the bag portion can be easily connected so as to keep air tightness.

In this case, the gas passage portion may include a pipe-shaped body which is provided at the bag portion and which is provided so as to be able to fit with the opening of the rotational connecting member. The gas passage portion may include a pipe-shaped body which is connected to an opening of the rotational connecting member and which is provided so as to be able to fit with an opening provided at the bag portion.

Furthermore, in the present invention, the inflator portion may include a case which has an outer pipe-shaped portion, a first presser portion, an inner pipe-shaped portion, and a second presser portion, the first presser portion is plate annular-shaped and is formed from the outer pipe-shaped portion toward the center, the inner pipe-shaped portion is formed within the outer pipe-shaped portion, and the second presser portion is flat annular-shaped and is formed outwardly from the inner pipe-shaped portion, and the annular-shaped opening portion can be formed between the first presser portion and the second presser portion.

In this case, the first presser portion may be formed by a large-diameter ring nut which is fit with a screw groove on an outer circumferential surface of the outer pipe-shaped portion, and the second presser portion may be formed by a small-diameter ring nut which is fit with a screw groove on an inner circumferential surface of the inner pipe-shaped portion. The outer pipe-shaped portion and the inner pipe-shaped portion may be connected by a flat annular-shaped bottom plate having connecting portions, and the connecting portions are stood upright at both edges of the bottom plate.

DESCRIPTION OF THE PREFERRED EMBODIMENTS

Figure 1:
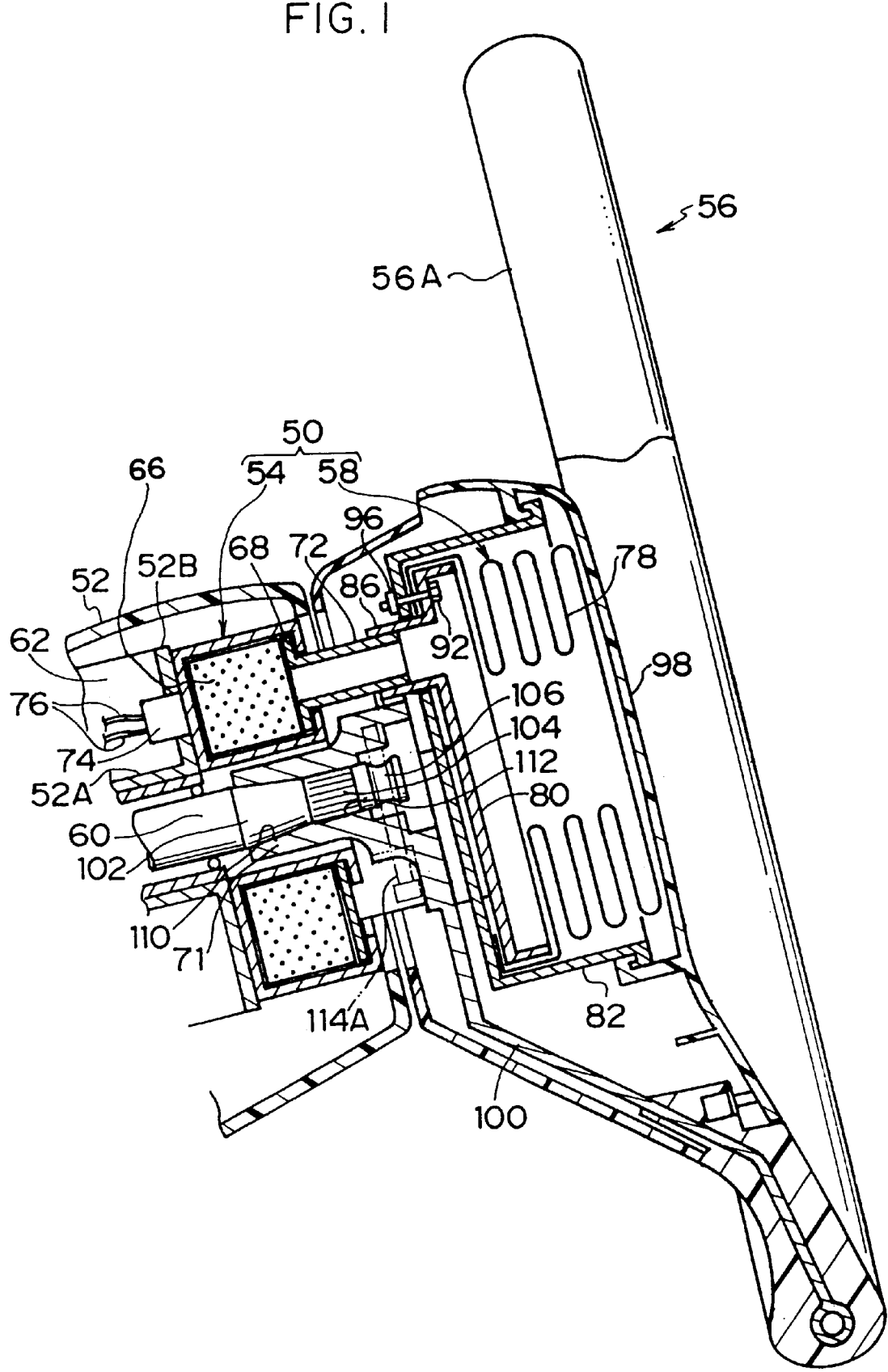
FIG. 1 is a cross-sectional view of an essential portion which, cut along a steering axis, shows a state in which an air bag apparatus relating to a present embodiment is attached to a steering column of a steering wheel.

FIG. 1 shows a cross-sectional view of an air bag apparatus relating to a present embodiment. As shown in FIG. 1, in this air bag apparatus 50, an inflator portion 54 is disposed at a steering column 52 side, i.e., a vehicle body, and a bag portion 58 is disposed at the steering wheel 56 side.

Figure 2:
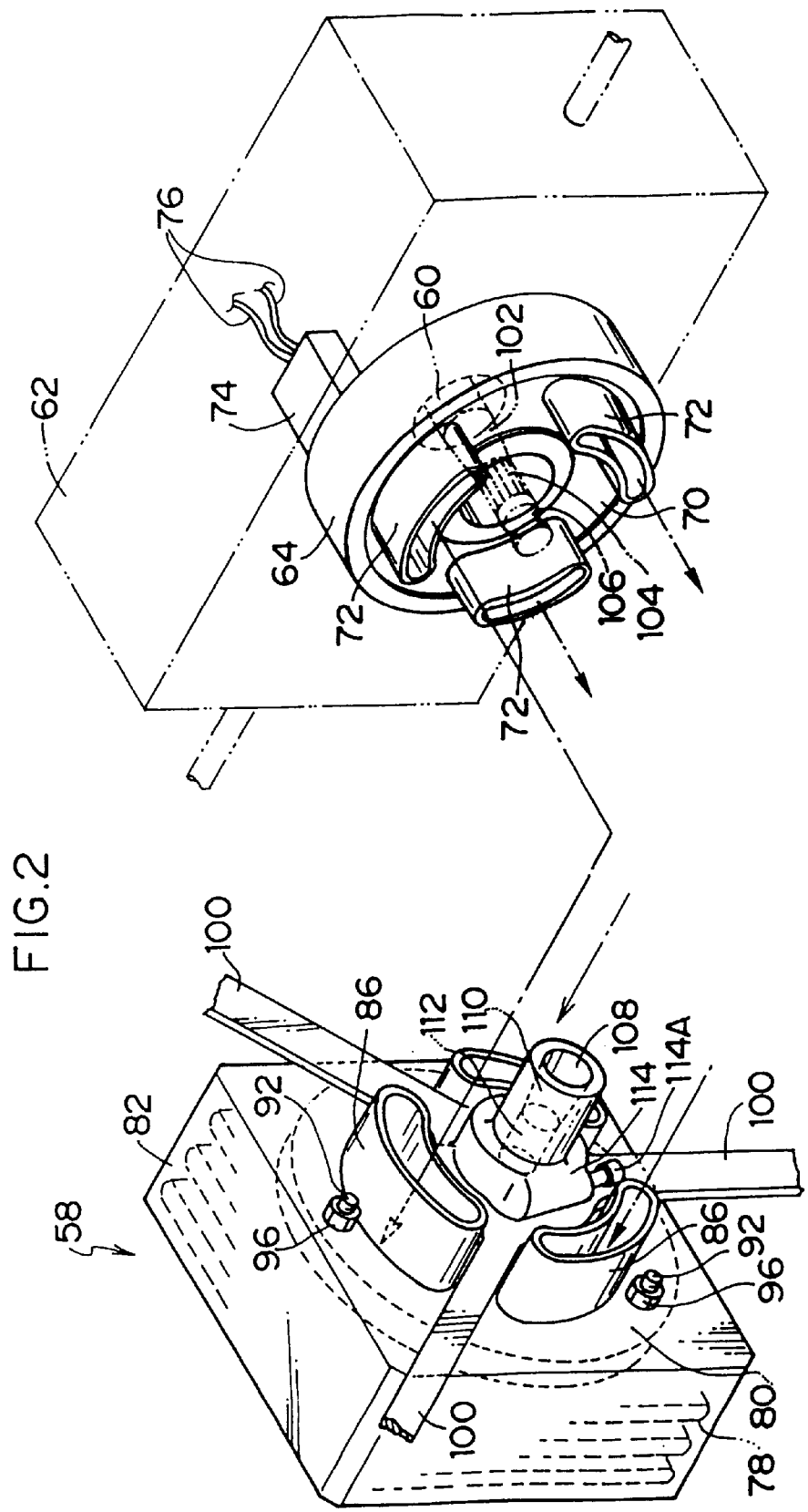
FIG. 2 is a schematic exploded perspective view which shows a state in which the air bag apparatus relating to the present embodiment is decomposed into an inflator portion and a bag portion.

As shown in FIGS. 1 and 2, the inflator portion 54, which is a device for blowing air, gas and the like, is disposed at the periphery of the distal end portion of a steering main shaft 60 disposed at the central portion of the steering column 52 and is fixed to the vehicle body. In the steering column 52, a lever combination switch portion 62, in which a turn signal switch, a head lamp switch, and the like are combined, is disposed at a position which is adjacent to the inflator portion 54.

Figure 5:
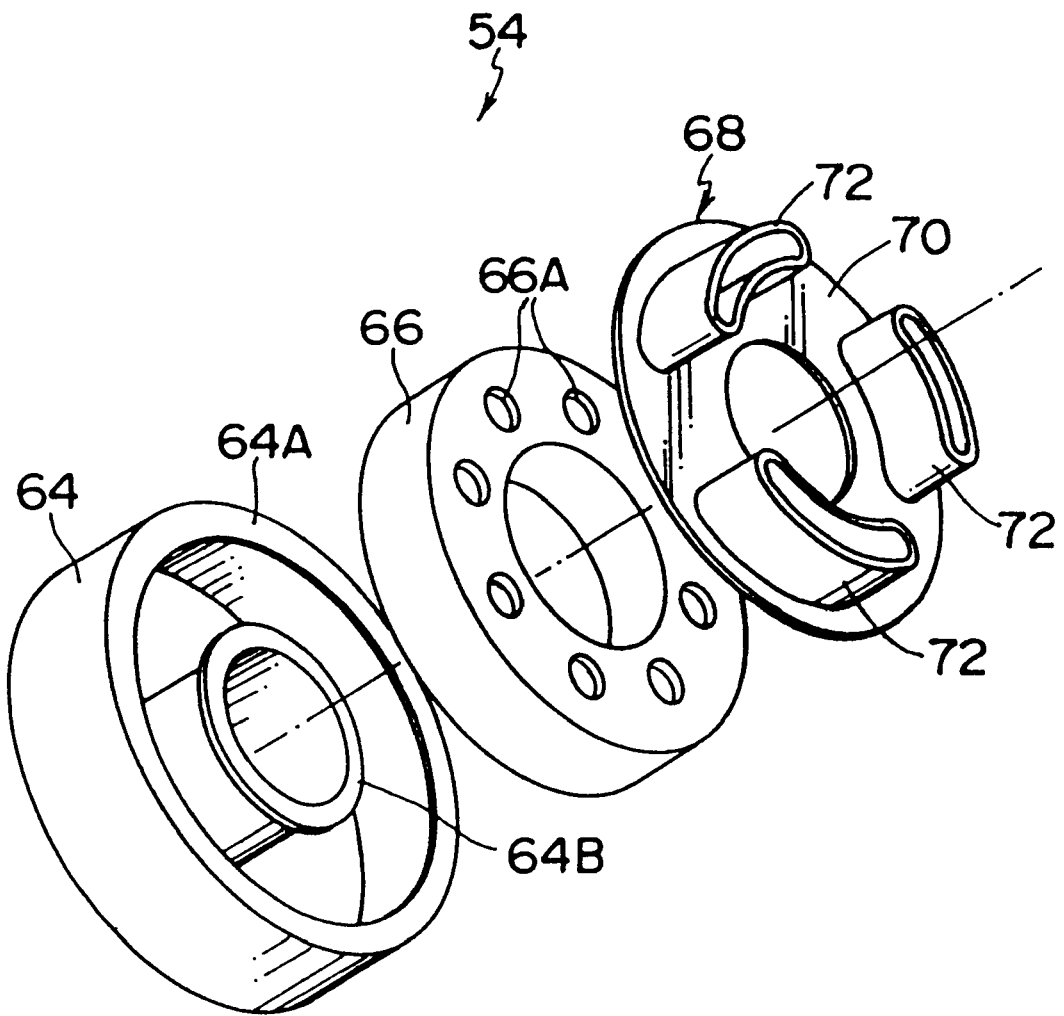
FIG. 5 is an exploded perspective view of an essential portion which shows the inflator portion of the air bag apparatus relating to the present embodiment.
Figure 6:
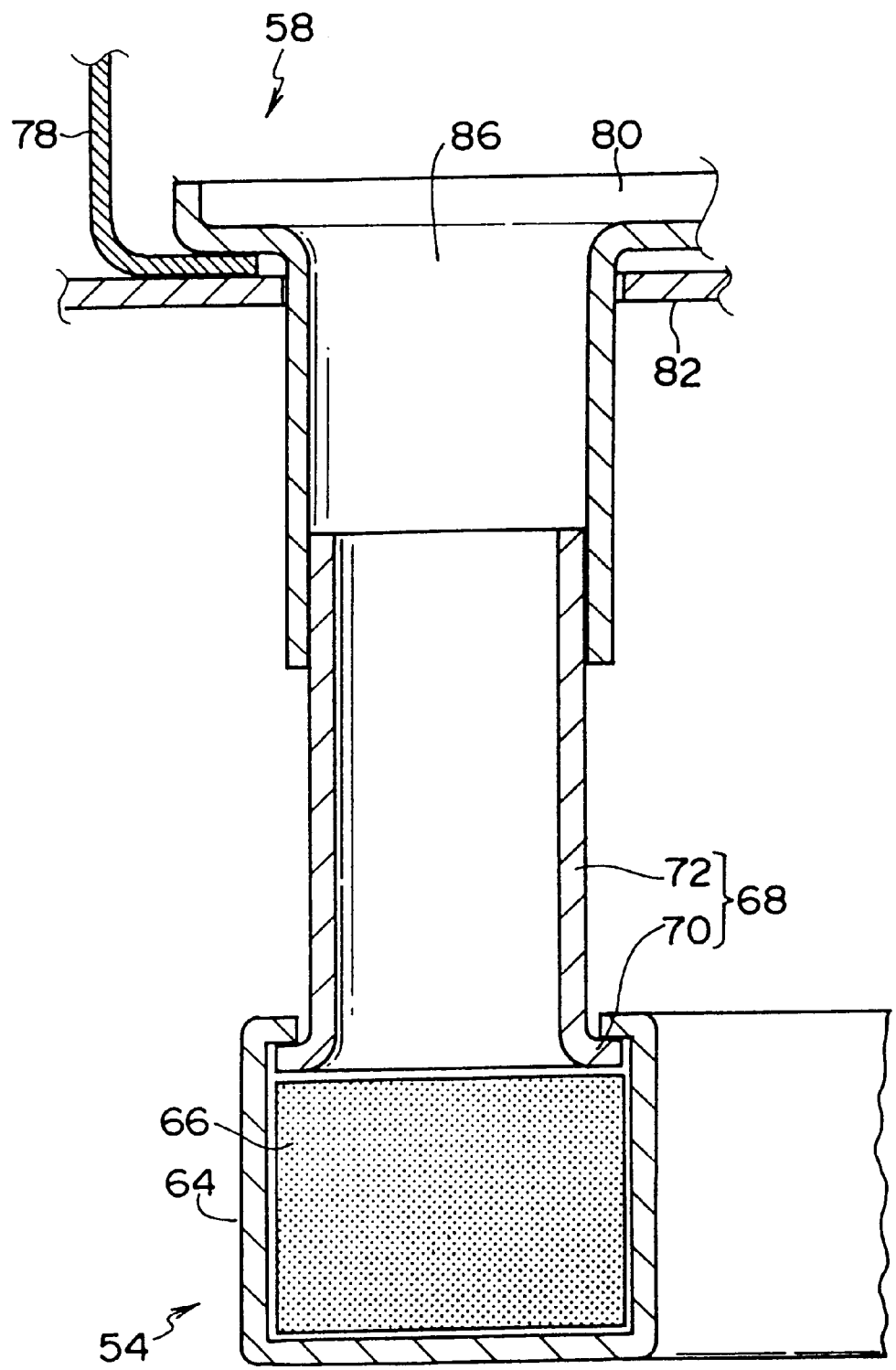
FIG. 6 is an enlarged cross-sectional view of an essential portion which, cut along the steering axis, shows connecting portion between the inflator portion and the bag portion in the air bag apparatus relating to the present embodiment.

As shown in FIGS. 5 and 6, the inflator portion 54 includes a case 64, an inflator 66 for generating gas, and a plate 68 serving as a rotational connecting member. The case 64 is made of a metal so that the case 64 can bear the high pressure and high temperature of gas upon generation thereof. The case 64 is formed as a ring-shaped strong container whose one side planar portion is opened. Further, the inner diameter of a hole portion provided at the center of the case 64 is so large that the boss 71 of the steering wheel 56 can be inserted freely.

A ring-shaped inflator 66, which is smaller than the case 64, is accommodated within the case 64. The inflator 66 is formed by a housing at which a plurality of holes 66A for gas generating agent, ignition agent, filter, and gas injection is formed.

A plate 68 is rotatably attached to the opening portion of the case 64, in which the inflator 66 is accommodated. In the plate 68, gas passage portions 72 are integrally connected to openings of the plate 68 at a plurality of predetermined places of a ring-shaped metal plate member 70. (Because the steering wheel 56 is formed with three spokes in the present embodiment, there are three predetermined places. However, in case of four spokes, there are four predetermined places. The number of places is determined in accordance with the number of intervals between the spokes). Each of the gas passage portions 72 is formed at the ring-shaped plate member 70 so that a pipe-shaped body integrally extends from the periphery of an opening at which a substantially arc-shaped ellipse is punched. After the plate 68 is inserted through the opening of the case 64, an outer side opening circumferential portion 64A of the case 64 is bent at a right angle toward the center and a central hole side opening circumferential portion 64B thereof is bent at a right angle outwardly. Accordingly, the plate 68 is coaxially rotatable with respect to the case 64 and the plate 68 is attached to the case 64 so that the plate 68 is not removed from the opening portion of the case 64. Further, even if there is a small amount of gas leakage, air tightness is maintained so that gas for expanding the bag body 32 is not escaped. Also, as occasion demands, a packing for air tightness is provided between the plate 68 and the outer side opening circumferential portion 64A, the central hole side opening circumferential portion 64B.

As shown in FIG. 1, the inflator portion 54 structured in this way is fixed to a flange portion 52B. The flange portion 52B is formed as a plane which intersects at a right angle with the axis of the steering shaft 60 in an axially-supporting pipe-shaped body 52A, of the steering shaft 60, which forms the steering column 52. An unillustrated portion of the axially-supporting pipe-shaped body 52A is fixed to the vehicle body. Further, in the inflator portion 54, a lead wire connecting portion 74, which energizes an ignition device built in the inflator 66, is fixed to a through-hole (unillustrated) punched at the case 64. The lead wire connecting portion 74 to be fixed and the unillustrated central control unit are connected by a lead wire 76.

Figure 3:
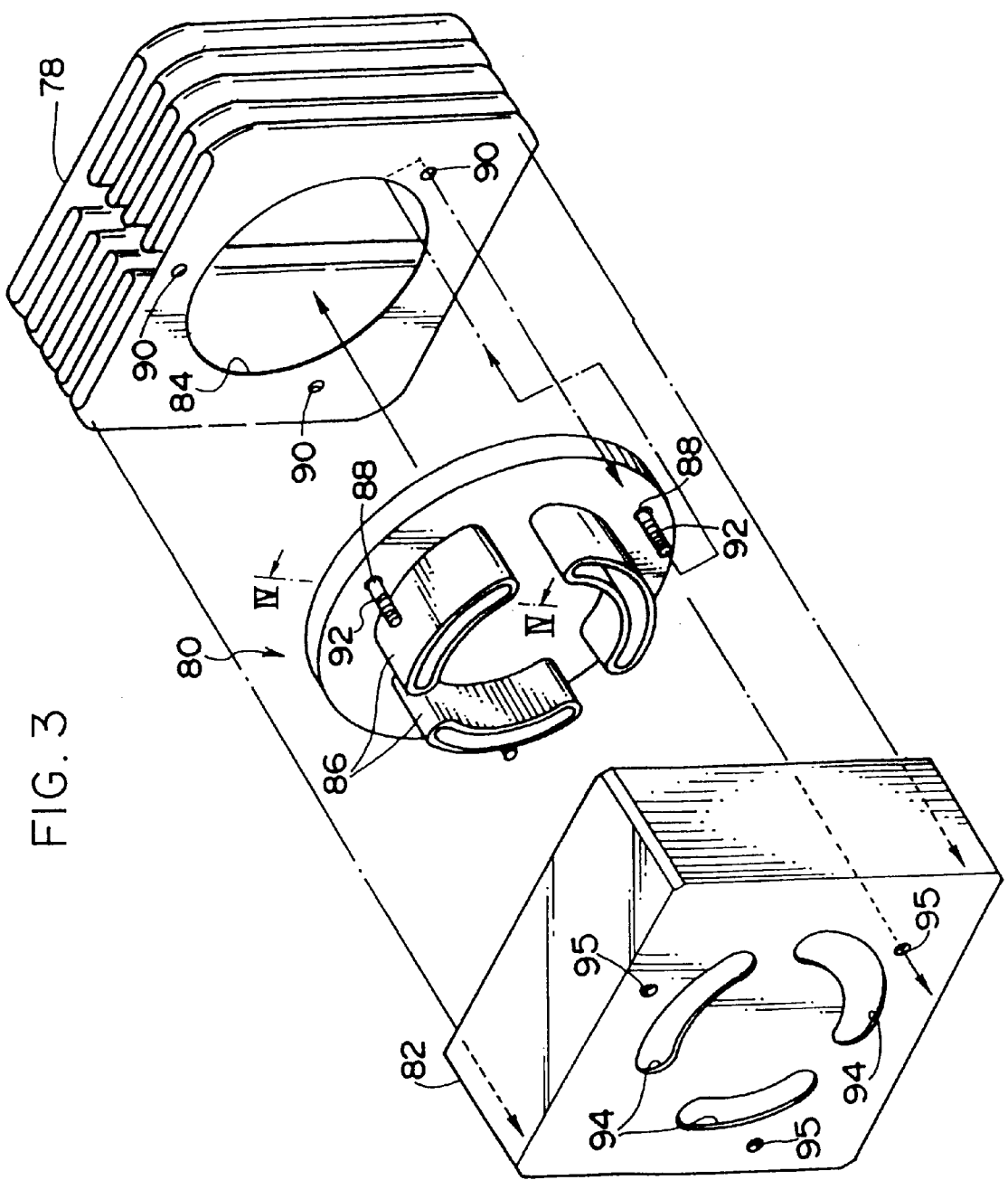
FIG. 3 is an exploded perspective view of an essential portion which shows the bag portion of the air bag apparatus relating to the present embodiment.

As shown in FIG. 3, a bag portion 58 disposed at the steering wheel 56 side in the air bag apparatus is mainly formed by a bag 78 serving as a bag body, a retainer 80, and a bag holder 82. The bag 78 is folded in the shape of a small rectangular parallelopiped so that a circular opening 84 of the bag body, which inflates in the shape of a compressed sphere, is placed on the bottom surface of the bag 78 as shown in FIG. 3. The retainer 80, which is made of a metal and formed as a strong member, is mounted to the circular opening 84 portion. The retainer 80 is disc-shaped so that the periphery of the circular flat plate is bent at a right angle with respect to a circular plane. In addition, a gas introduction passage portion 86 is integrally formed at a plurality of predetermined places (three places in the present embodiment) of the retainer 80 so as to correspond to the gas passage portions 72 of the plate 68 in the aforementioned inflator portion 54. In each of the gas introduction passage portions 86, a pipe-shaped body extends integrally from the periphery of the opening in which a substantially arc-shaped ellipse is punched at the retainer 80, and each of the distal end portions of the gas introduction passage portions 86 is inserted through and fit with the outer side of the corresponding pipe-shaped gas passage portion 72.

The bag 78 and the retainer 80 are accommodated within the bag holder 82. The bag holder 82 is formed in the shape of a rectangular boxed body in which one side portion at the occupant side is opened. A through-hole 94, which is a substantially arc-shaped ellipse and through which each of the gas introduction passage portions 86 of the retainer 80 is inserted, is penetrated through the bottom surface portion of the bag holder 82.

Figure 4:
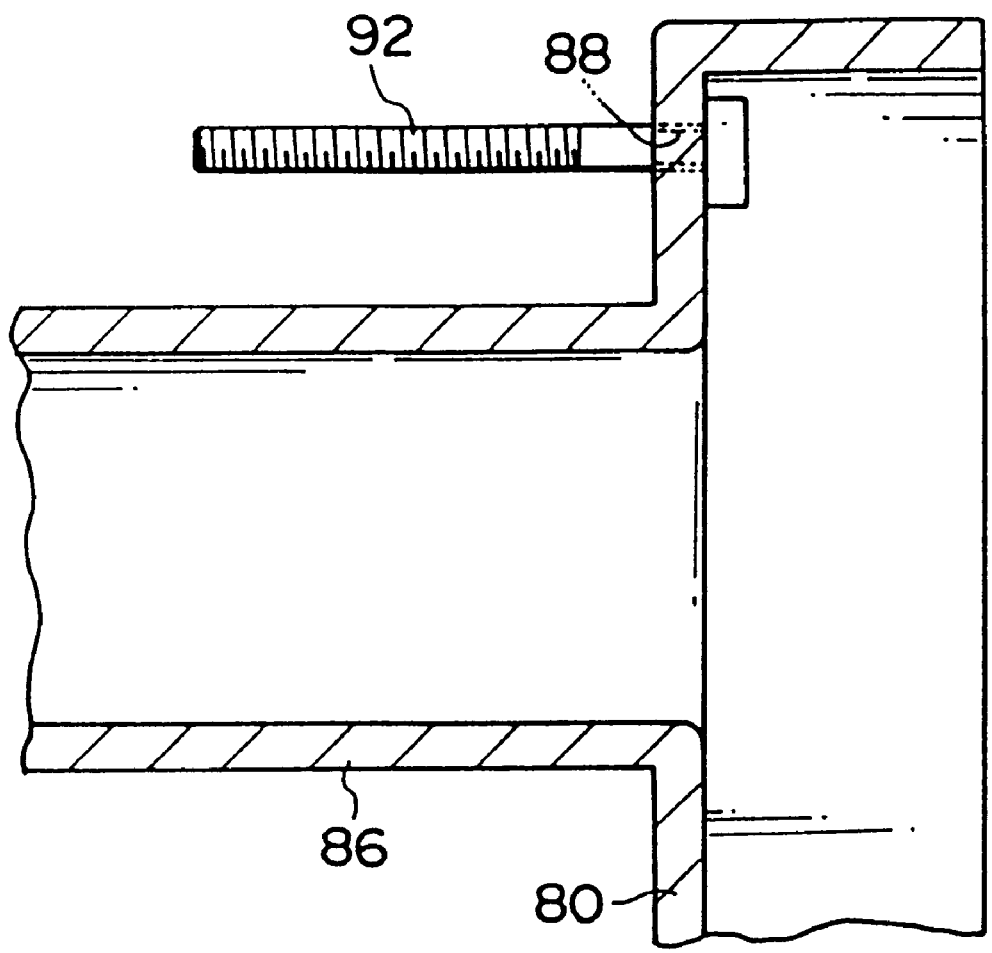
FIG. 4 is an enlarged cross-sectional view of an essential portion, taken along line IV—IV in FIG. 3.

A through-hole 88 is punched at predetermined three places of the disc-shaped portion of the retainer 80. As shown in FIG. 4, a bolt 92 is inserted through the through-hole 88 and fixed at the retainer 80 in the direction which is the same as the protruding direction of the gas introduction passage portion 86. The retainer 80 is inserted into the bag 78 through the circular opening 84 thereof, and each of the bolts 92 is inserted through a through-hole 90 which is formed near the opening 84 of the bag 78. Further, as shown in FIGS. 1 and 3, the retainer 80 attached to the bag 78 is accommodated within the box of the bag holder 82, and each of the gas introduction passage portions 86 penetrates through the corresponding through-hole 94. Moreover, each of the bolts 92 is inserted through a through-hole 95 which is punched at the bottom surface of the bag holder 82 so as to correspond to each of the through-holes 88 of the retainer 80. A nut 96 is fit with the bolt 92, and the bag 78, the retainer 80, and the bag holder 82 are integrally secured. The bag portion 58 shown in FIG. 2 is thereby formed.

The bag portion 58 is disposed between the boss 71 of the steering wheel 56 and a pat cover 98. A spoke core 100 is disposed at a portion between the adjacent gas introduction passage portions 86 of the retainer 80.

As can be seen in FIGS. 1, 2 and 6, the bag portion 58 is integrally assembled to the inflator portion 54. Namely, the outer peripheral portion of each of the gas passage portions 72 of the inflator portion 54 is inserted and fit so as to slidingly abut the inner peripheral portion of each of the corresponding gas introduction passage portions 86 of the bag portion 58. The inflator portion 54 and the bag portion 58 are assembled so that the respective gas passage portions 72 communicate with the gas introduction passage portions 86 within the air bag apparatus and the bag holder 82 is mounted to the steering wheel 56.

As shown in FIGS. 1 and 2, the steering main shaft 60 of the steering column 52 and the boss 71 of the steering wheel 56 are secured. For securing, a conical inclined surface portion 102, a serration portion 104, and a removal preventing groove portion 106 are provided at the distal end portion of the steering main shaft 60.

Correspondingly, in the boss 71 portion, a conical inclined surface hole portion 110, a serration hole portion 112, and a removal preventing screw securing portion 114 are provided at a hole portion 108 for securing a main shaft.

Then, the distal end portion of the steering main shaft 60 is inserted through the hole portion 108 for securing a main shaft, and the conical inclined surface portion 102 is fit with the conical inclined surface hole portion 110 so that the steering wheel 56 does not enter any further than the root side of the steering main shaft 60. The serration portion 104 is fit with the serration hole portion 112 such that the serration portion 104 and the serration hole portion 112 do not rotate relatively around the shafts thereof. The body portion of a screw 114A, which is screwed to and inserted into the removal preventing screw securing portion 114, is interposed so as to intersect the removal preventing groove portion 106. The steering wheel 56 is supported so as to be not removed from the steering main shaft 60. Accordingly, the steering wheel 56 is integrally mounted to the steering main shaft 60. The mounting operation can be effected by putting a tool from the transverse side of the steering column 52 and rotating the screw 1 14A. Further, as the other means of connecting the steering main shaft 60 and the steering wheel 56, it is possible that a shaft member extends from the portion which corresponds to the boss 71 of the steering wheel 56 to the position which has passed the inflator portion 54, and the distal end of the shaft member is secured by the distal end of the steering main shaft 60 which is formed shorter than the one shown in FIG. 1.

Figure 7:
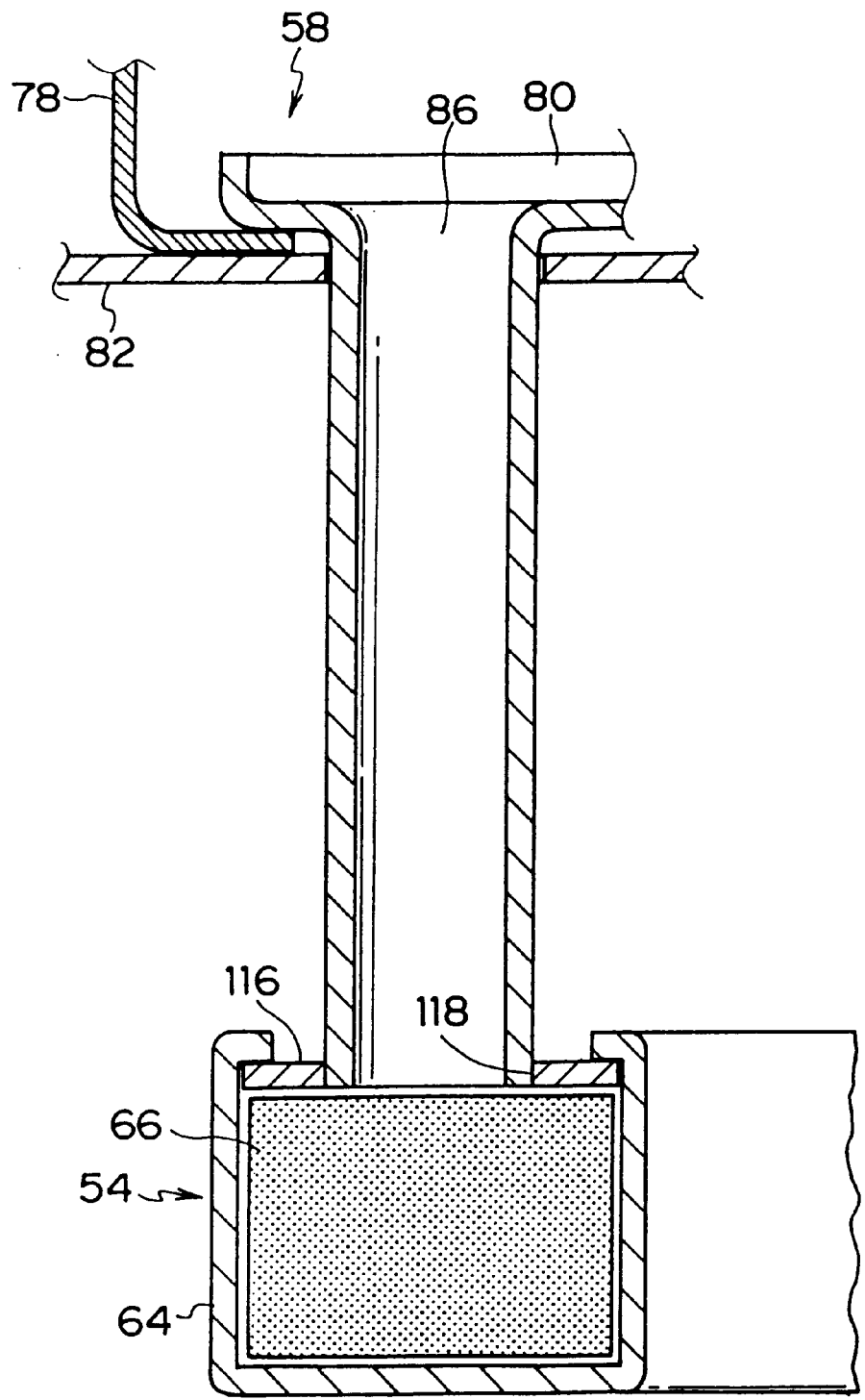
FIG. 7 is an enlarged cross-sectional view of an essential portion which corresponds to FIG. 6 and which shows the other structural example of connecting portion between the inflator portion and the bag portion in the air bag apparatus relating to the present embodiment.

Next, instead of an example in which the gas passage portion 72 and the gas introduction passage portion 86 serve as means of connecting the inflator portion 54 and the bag portion 86 in the aforementioned embodiment, variant examples will be explained with reference to FIGS. 7 and 8. In a first variant example shown in FIG. 7, only openings 118, at which a substantially arc-shaped ellipse is punched, are provided at three predetermined places of an annular flat plate of a plate 116 in an inflator portion 54. Gas introduction passage portions 86 of a retainer 80 in a bag portion 58 are extended and the distal end portions of the gas introduction passage portions 86 are fit with the openings 118 of the plate 116. The connecting portion is thereby formed.

Figure 8:
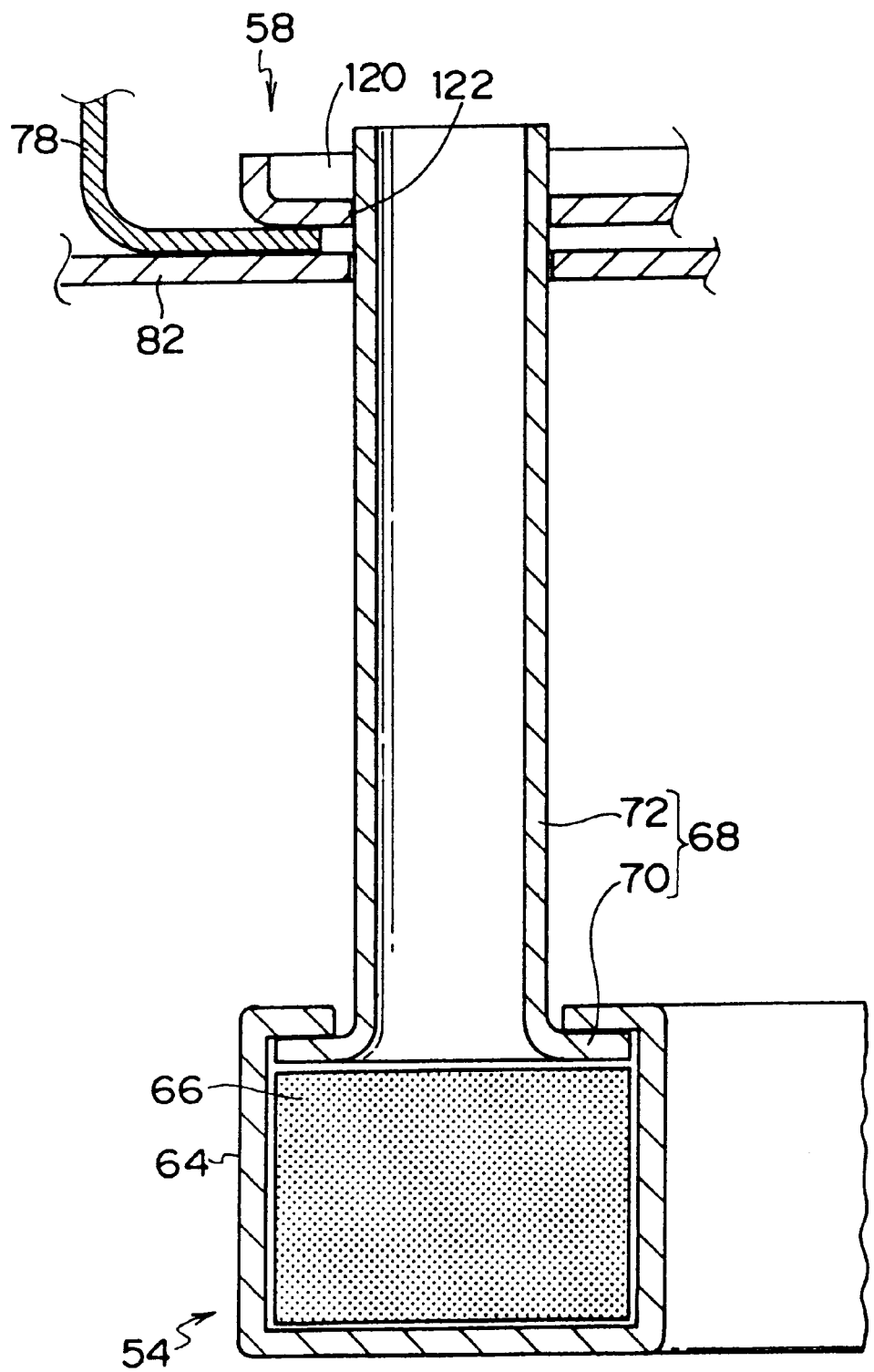
FIG. 8 is an enlarged cross-sectional view of an essential portion which corresponds to FIG. 6 and which shows the other structural example of connecting portion between the inflator portion and the bag portion in the air bag apparatus relating to the present embodiment.

Moreover, in a second variant example shown in FIG. 8, an opening 122, at which a substantially arc-shaped ellipse is punched, is provided at each of three predetermined places of the circular disc-shaped portion of a retainer 120 in a bag portion 58. Gas passage portions 72 of a plate 68 in an inflator portion 54 are extended and the distal end portions of the gas passage portions 72 are fit with the openings 122 of the retainer 120. The connecting portion is thereby formed.

Figure 9:
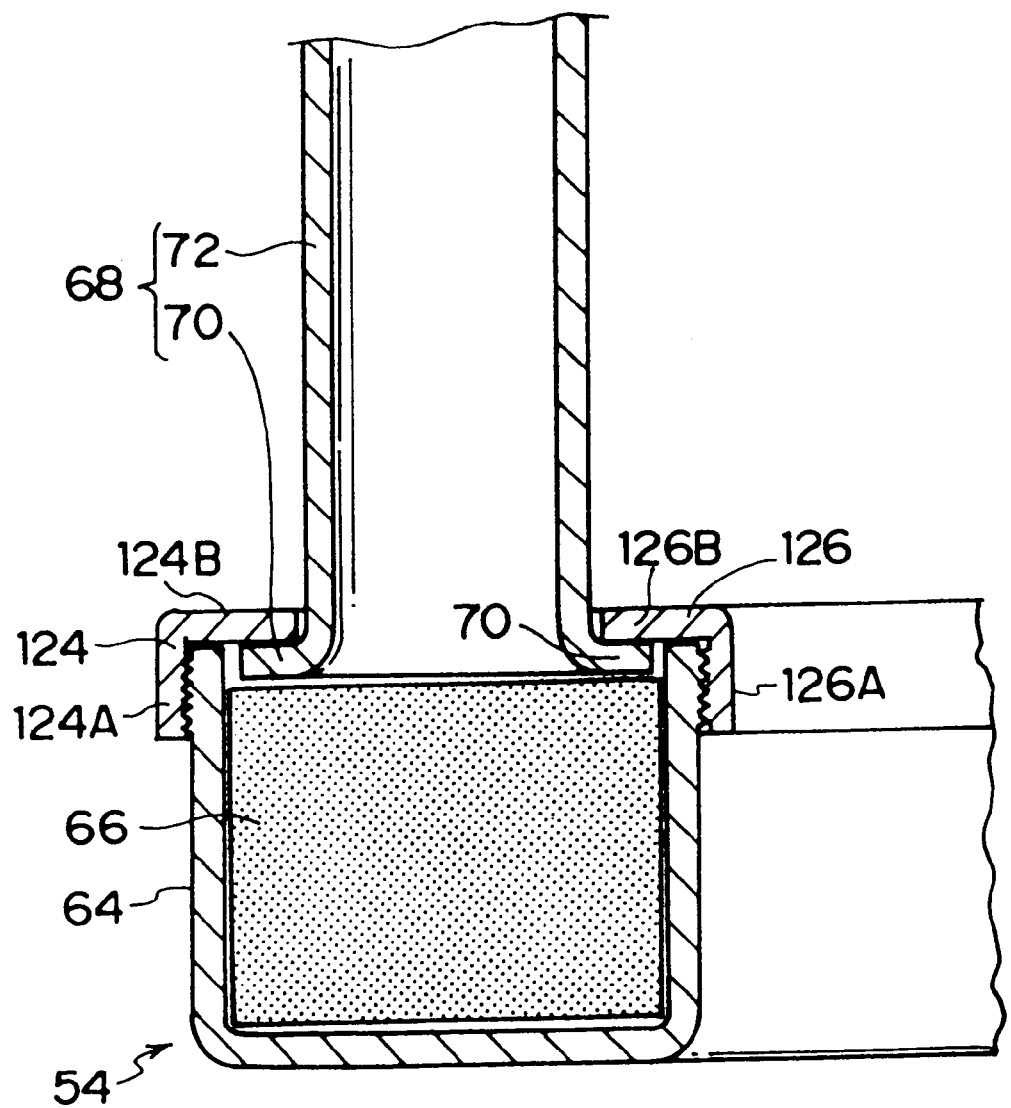
FIG. 9 is an enlarged cross-sectional view of an essential portion which corresponds to FIG. 6 and which shows the other structural example of connecting portion between the inflator portion and the bag portion in the air bag apparatus relating to the present embodiment.

Next, the other structural example of the case 64 in the inflator portion 54 will be explained with reference to FIGS. 9 and 10. In the third variant example shown in FIG. 9, a screw groove is formed at the outer circumferential surface portion of a large-diameter circumferential opening portion in which one side plane surface portion of the case 64 is opened. Further, a screw groove is formed at the inner circumferential surface portion of a small-diameter circumferential opening portion which forms a central hole portion.

A large-diameter ring nut 124 is fit with a screw groove of the large-diameter circumferential opening portion of the case 64. In the large-diameter ring nut 124, a screw groove is formed at the inner side of a pipe-shaped portion 124A and a plate annular-shaped presser portion 124B, which is bent from the pipe-shaped portion 124A at a right angle in the central direction of the nut 124, is formed. The large-diameter ring nut 124 is fit with the screw groove of the large-diameter circumferential opening portion of the case 64 and the presser portion 124B slidably supports the planar outer circumferential portion of a ring-shaped plate member 70 of a plate 68.

In addition, a small-diameter ring nut 126 is fit with a screw groove of the small-diameter circumferential opening portion of the case 64. In the small-diameter ring nut 126, the screw groove is formed at the outer side of a pipe-shaped portion 126A and a plate annular-shaped presser portion 126B, which is bent from the pipe-shaped portion 126A at a right angle outwardly in the radial direction of the nut 124, is formed.

The small-diameter ring nut 126 is fit with the screw groove of the small diameter circumferential opening portion of the case 64 and the presser portion 126B slidably supports the planar inner circumferential portion of the ring-shaped plate member 70 of the plate 68. As a result, the plate 68 is rotatably supported at the case 64 by the large-diameter ring nut 124 and the small-diameter ring nut 126.

Figure 10:
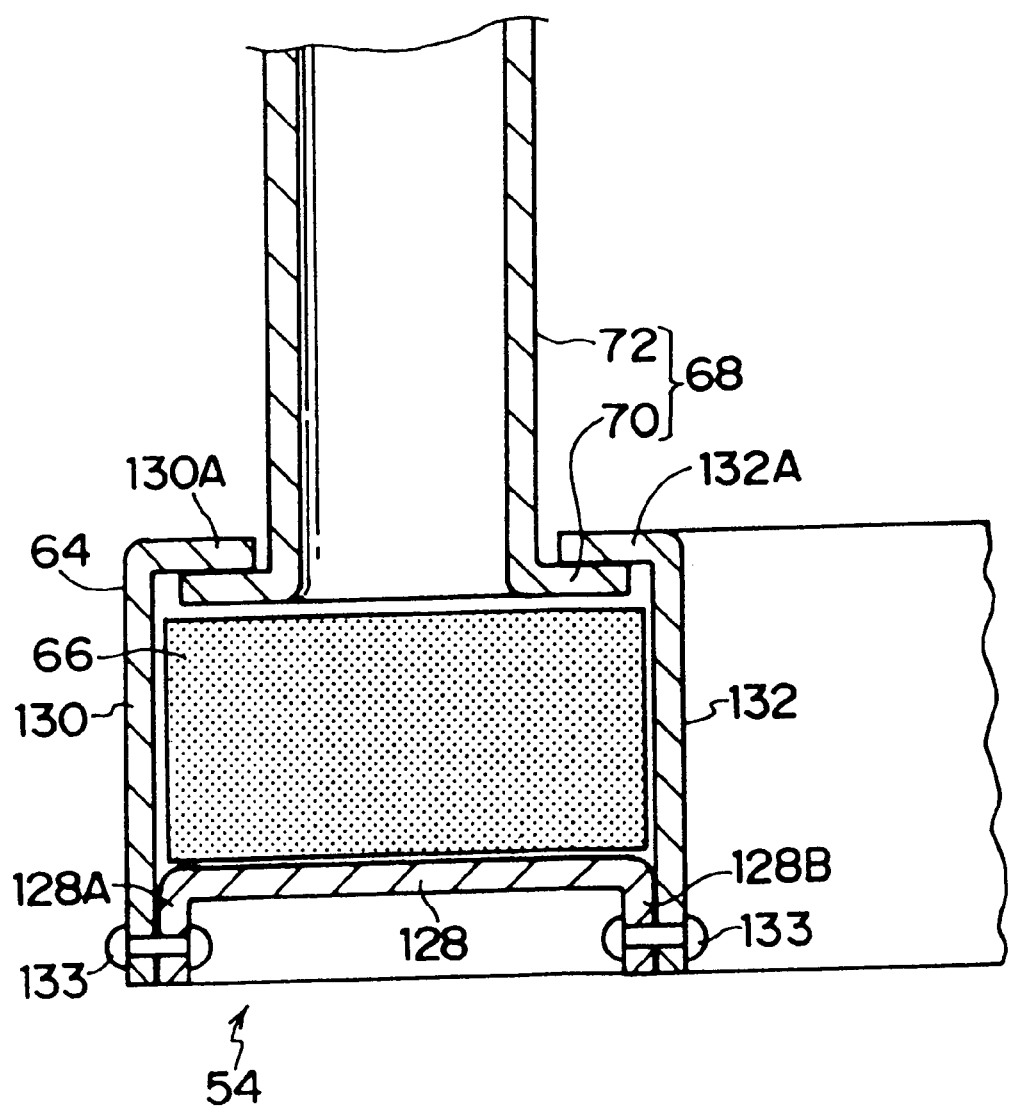
FIG. 10 is an enlarged cross-sectional view of an essential portion which corresponds to FIG. 6 and which shows the other structural example of connecting portion between the inflator portion and the bag portion in the air bag apparatus relating to the present embodiment.
Figure 11:
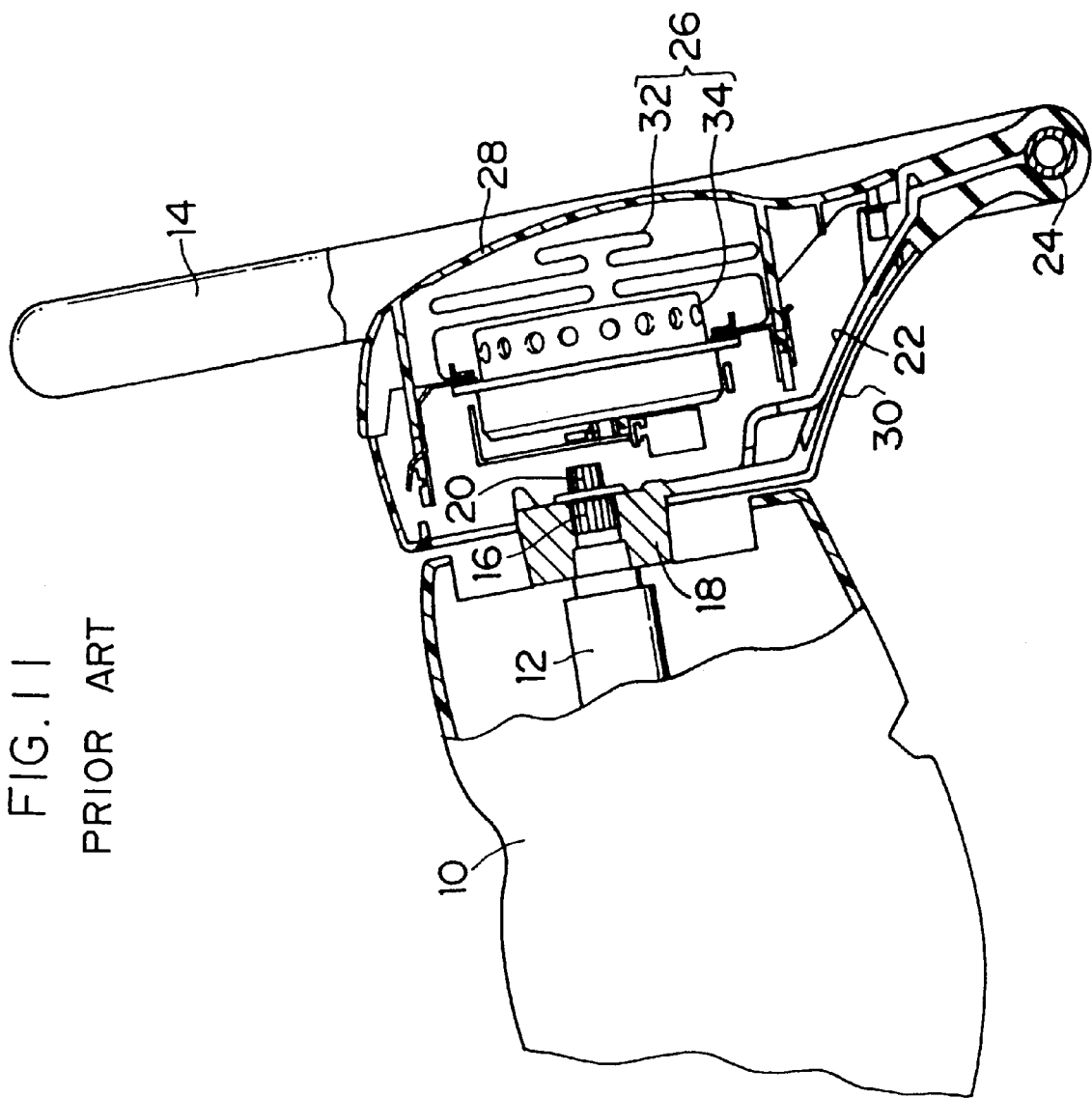
FIG. 11 is a cross-sectional view of an essential portion which shows a conventional air bag apparatus attached to a steering wheel.

Further, in a fourth variant example shown in FIG. 10, a case 64 is formed with a bottom plate portion 128, an outer circumferential pipe-shaped portion 130, and an inner circumferential pipe-shaped portion 132. The bottom plate portion 128 is plate-ring shaped, and each of the inner circumferential portion and the outer circumferential portion thereof is bent at a right angle in the same direction. Moreover, the outer circumferential pipe-shaped portion 130 is formed in a pipe shape which has an inner diameter in which the outer circumferential pipe-shaped portion 130 is fit with an outer circumferential surface 128A of the bottom plate portion 128. The free end circumferential opening portion of the outer circumferential pipe-shaped portion 130 is formed with a support receiving portion 130A, whose circumferential opening portion is bent at a right angle toward the center.

Furthermore, the inner circumferential pipe-shaped portion 132 is formed in a pipe shape which has an outer diameter in which the inner circumferential pipe-shaped portion 132 is fit with an inner circumferential surface 128B of the bottom plate portion 128. The free end circumferential opening portion of the inner circumferential pipe-shaped portion 132 is formed with a support receiving portion 132A, whose circumferential opening portion is bent at a right angle outwardly in the radial direction.

A pipe-shaped opening portion of the outer circumferential pipe-shaped portion 130, at which the support receiving portion 130A is not provided, is fit with the outer circumferential surface 128A of the bottom plate portion 128. The pipe-shaped opening portion and the outer circumferential surface 128A are screwed through penetrating through-holes and secured by a nut, or alternatively, secured by a rivet 133. The outer circumferential pipe-shaped portion 130 and the bottom plate portion 128 are thereby integrated. Further, a pipe-shaped opening portion of the inner circumferential pipe-shaped portion 132, at which the support receiving portion 132A is not provided, is fit with the inner circumferential surface 128B of the bottom plate portion 128. The pipe-shaped opening portion and the inner circumferential surface 128B are screwed through penetrating through-holes and secured by a nut, or alternatively, secured by the rivet 133. The inner circumferential pipe-shaped portion 132 and the bottom plate portion 128 are thereby integrated. As a result, the case 64 whose cross-sectional configuration is formed in the inverted U-shape as shown in FIG. 10 is formed.

Next, the operation of an air bag apparatus relating to the aforementioned embodiment will be explained. In the air bag apparatus, the inflator portion 54 is fixed to the steering column 52, and the bag portion 58 is fixed to the steering wheel 56. As a result, when the steering wheel 56 is rotated due to steerage, the bag portion 58 and the plate 68 portion integrally rotate along with the steering wheel 56. At this time, the plate 68 rotates at the circular opening portion of the case 64. A ball bearing, a low friction plate member, or the like which serves as a member for reducing frictional resistance may be used at a slide portion.

Next, when large acceleration (rapid deceleration) is applied to a vehicle, ignition current is flowed to the ignition device within the inflator 66 through the lead wire 76 and the lead wire connecting portion 74 due to the designation of the central control unit. The gas generating agent within the inflator 66 is thereby ignited. Then, the gas, which has been generated due to the combustion of the gas generating agent in the inflator 66, is rapidly filled within the bag 78 through the gas passage portion 72 and the gas introduction passage portion 86. As the bag 78 is inflated, the pat cover 98 is broken away and the air bag is unfolded on the steering wheel 56.

Further, in the present embodiment, because the inflator portion 54 is fixed and attached to the steering column 52, the lead wire connecting portion 74 of the inflator portion 54 and the central control unit are directly connected by the lead wire 76, and a roll connector is not used therein. Moreover, if the inflator portion 54 is disposed at the position at which a roll connector is provided conventionally, the steering column 52 can be formed without increasing the size thereof.

Moreover, it suffices that only the bag portion 58 is provided at the concave space area which is surrounded by the boss 71 and the spoke core 100 in the steering wheel 56 and the inflator portion 54 can be omitted from the area. Accordingly, a space for the components of the air bag apparatus which occupy the concave space of the steering wheel 56 can be made small, and the degrees of freedom in designing the entire steering wheel 56 can be improved. In addition, since the degrees of freedom in size and shape of the bag portion 58 increase, the degrees of freedom in folding the bag 78 increase, and the way of folding can be changed so that the bag 78 unfolds more preferably. Furthermore, vibration characteristics can be improved due to reduction of the mass of the steering wheel portion.

Additionally, if the steering wheel 56 is designed so that the surface of the pat cover 98, which covers the bag portion 58, is closer to the boss 71 side than a ring portion 56A, the space between the ring portion 56A and the pat cover 98 is increased. Thus, a vehicle operator can see meters, which are provided at the instrument panel portion within the vehicle, through the space. Consequently, visibility to the meters can be improved.

The air bag apparatus may not be operated electrically. Further, the inflator may be attached to the fixed position other than that of the steering column. The gas passage portion 72 serving as a gas passage portion may not be penetrated through the spokes. For example, the spokes themselves may be penetrated, or alternatively, the large-diameter boss may be penetrated. The inflator may be the gas filling type.

Because the present invention is structured as described above, a superior effect is achieved in that the number of parts of the air bag apparatus attached to the steering wheel can be reduced.

What is claimed is:

1. An air bag apparatus, comprising:
   an inflator portion which is fixedly disposed at a vehicle body and which surrounds a steering shaft of a steering column;
   a bag portion which is attached to a steering wheel and which rotates along with the steering wheel; and
   a rotatable connecting portion for rotatably and sealingly connecting said inflator portion and said bag portion, said connecting portion being provided with a circular, rotatable plate having at least one gas passage portion, the circular plate being movable with respect to one of said inflator portion and said bag portion and sealingly engaged thereto so as to keep airtightness, the gas passage portion being in communication with gas discharged from said inflator portion so as to inflate and unfold a bag when said inflator portion generates gas,
   wherein the circular plate is rotatable attached to said inflator portion, and the gas passage portion includes a first pipe-shaped body and a second pipe-shaped body, the first pipe-shaped body being connected to an opening in the circular plate and provided parallel to an axial direction of the steering shaft, and the second pipe-shaped body being provided at said bag portion parallel to an axial direction of the steering shaft wherein the first and second pipe-shaped bodies interfit with each other.

2. An air bag apparatus according to claim 1, wherein said gas passage portion of said circular plate introduces gas from said inflator portion to said bag portion through an interval between spokes of the steering wheel.

3. An air bag apparatus according to claim 1, wherein said inflator portion has an annular opening portion which opens in an annular shape around an axis of the steering shaft, and the circular plate is rotatably connected to the annular opening portion.

4. An air bag apparatus comprising:
   an inflator portion which is fixedly disposed at a vehicle body around a steering shaft of a steering column;
   a bag portion which is attached to a steering wheel and which rotates along with the steering wheel; and
   a connecting portion which is provided with a rotational connecting member and a gas passage portion, the rotational connecting member being rotatably attached to at least one of said inflator portion and said bag portion so as to keep airtightness, the gas passage portion being connected to an opening of the rotational connecting member such that the gas flow between said inflator portion and said bag portion in a relatively rotatable state, and which introduces the gas generated at said inflator portion to said bag portion so as to inflate and unfold a bag,
   wherein said inflator portion has an annular opening portion which opens in the annular shape around an axis of the steering shaft, and the rotational connecting member is rotatably attached to the annular opening portion, and
   wherein said inflator portion includes a case which has an outer pipe-shaped portion, and a first presser portion, an inner pipe-shaped portion, and a second presser portion, the first presser portion is plate annular-shaped and is formed from the outer pipe-shaped portion toward the center, the inner pipe-shaped portion is formed within the outer pipe-shaped portion, and the second presser portion is flat annular-shaped and is formed outwardly from the inner pipe-shaped portion, and the annular-shaped opening portion is formed between the first presser portion and the second presser portion.

5. An air bag apparatus according to claim 4, wherein the first presser portion is formed by a large-diameter ring nut which is fit with a screw groove on an outer circumferential surface of the outer pipe-shaped portion, and the second presser portion is formed by a small-diameter ring nut which is fit with a screw groove on an inner circumferential surface of the inner pipe-shaped portion.

6. An air bag apparatus according to claim 4, wherein the outer pipe-shaped portion and the inner pipe-shaped portion are connected by a flat annular-shaped bottom plate having connecting portions, and the connecting portions are stood upright at both edges of the bottom plate.

7. An air bag apparatus, comprising:
   an inflator portion which is fixedly disposed at a vehicle body and which surrounds a steering shaft of a steering column;
   a bag portion which is attached to a steering wheel and which rotates along with the steering wheel; and
   a rotatable connecting portion for rotatably and sealingly connecting said inflator portion and said bag portion, said connecting portion being provided with a circular, rotatable plate having at least one gas passage portion, the circular plate being movable with respect to one of said inflator portion and said bag portion and sealingly engaged thereto so as to keep airtightness, the gas passage portion being in communication with gas discharged from said inflator portion so as to inflate and unfold a bag when said inflator portion generates gas,
   wherein the circular plate is attached to said inflator portion, and the gas passage portion includes a pipe-shaped body which is provided at said bag portion and which is provided so as to be able to fit with an opening of the circular plate.

8. An air bag apparatus, comprising:
   an inflator portion which is fixedly disposed at a vehicle body and which surrounds a steering shaft of a steering column;
   a bag portion which is attached to a steering wheel and which rotates along with the steering wheel; and
   a rotatable connecting portion for rotatably and sealingly connecting said inflator portion and said bag portion, said connecting portion being provided with a circular, rotatable plate having at least one gas passage portion, the circular plate being movable with respect to one of said inflator portion and said bag portion and sealingly engaged thereto so as to keep airtightness, the gas passage portion being in communication with gas discharged from said inflator portion so as to inflate and unfold a bag when said inflator portion generates gas,
   wherein the circular plate is attached to said inflator portion, and the gas passage portion includes a pipe-shaped body which is connected to an opening of the circular plate and which is interfittable with an opening provided at said bag portion.

* * * * *